United States Patent [19]

Hayashi et al.

[11] Patent Number: 4,497,292
[45] Date of Patent: Feb. 5, 1985

[54] BEARING BEAM STRUCTURE

[75] Inventors: Yoshimasa Hayashi, Kamakura; Naoki Ogawa, Yokohama, both of Japan

[73] Assignee: Nissan Motor Company, Limited, Yokohama, Japan

[21] Appl. No.: 433,886

[22] Filed: Oct. 13, 1982

[30] Foreign Application Priority Data

Oct. 14, 1981 [JP] Japan ................... 56-163988

[51] Int. Cl.³ .................. F02F 7/00; F02B 77/13; F16M 1/021
[52] U.S. Cl. .................. 123/195 H; 123/198 E; 384/429
[58] Field of Search ........... 123/195 R, 195 C, 195 S, 123/195 H, 198 E; 384/429

[56] References Cited

U.S. PATENT DOCUMENTS

| 2,098,451 | 11/1937 | Gilmore | 123/195 R |
| 2,865,341 | 12/1958 | Dolza | 123/195 R |
| 4,213,440 | 7/1980 | Abe et al. | 123/195 C |
| 4,245,595 | 1/1981 | Abe et al. | 123/195 C |
| 4,412,514 | 11/1983 | Hayakawa et al. | 123/195 H |

FOREIGN PATENT DOCUMENTS

| 472638 | 4/1947 | Belgium . |
| 0056588 | 7/1982 | European Pat. Off. . |
| 524880 | 4/1931 | Fed. Rep. of Germany . |
| 2135632 | 12/1972 | France . |
| 2275124 | 1/1976 | France . |
| 0009913 | 1/1978 | Japan ................ 123/195 C |

Primary Examiner—Craig R. Feinberg
Assistant Examiner—David A. Okonsky
Attorney, Agent, or Firm—Schwartz, Jeffery, Schwaab, Mack, Blumenthal & Koch

[57] ABSTRACT

A bearing beam structure is secured to a cylinder block of an internal combustion engine and includes a plurality of main bearing cap sections each of which associates with each bearing section of the cylinder block so as to rotatably support a crankshaft. At least a beam section is rigidly connected to the lower end portion of each bearing cap section to securely connect all the bearing cap sections with each other. Additionally, first and second side wall sections are rigidly connected to the opposite side portions of each bearing cap section to securely connect all the bearing cap sections with each other. Accordingly, the bearing beam structure is improved in rigidity to suppress various vibrations of the cylinder block, thereby effectively achieving total engine noise reduction.

7 Claims, 14 Drawing Figures

BEARING BEAM STRUCTURE

BACKGROUND OF THE INVENTION

1. Field of the Invention

This invention relates to an improvement in a bearing beam structure installed to the bottom part of a cylinder block in order to rotatably support a crankshaft of an automotive internal combustion engine.

2. Description of the Prior Art

In usual automotive internal combustion engines, a crankshaft is rotatably supported through bearing metals by a plurality of bearing sections formed at the bottom part of a cylinder block and a plurality of bearing caps which are secured respectively to the cylinder block bearing sections. The bearing caps are installed in positions separate and independent from each other, and accordingly tend to vibrate in fore and aft directions (in the direction of the crankshaft axis) and to come down under the influence of vibration input from the crankshaft due to combustion impact force. This excites vibration of the skirt section of a cylinder block, thereby emitting considerable noise. In view of this, a bearing beam has been proposed in which a plurality of bearing caps are integrally connected with each other by means of a rigid elongated beam located at the bottom part of each bearing cap section. Such a bearing beam structure is effective for preventing each bearing cap from vibrating in the fore and aft direction, but not effective against, for example, the torsional deformation of the cylinder block around the crankshaft axis, thereby allowing noise generation due to such vibration of the cylinder block.

SUMMARY OF THE INVENTION

A bearing beam structure according to the present invention is secured to the bottom part of a cylinder block of an internal combustion engine. The bearing beam structure comprises a plurality of main bearing cap sections a of which associates with each bearing section formed at the bottom part of the cylinder block so as to rotatably support the journal of a crankshaft therebetween. At least a beam section is connected to the lower end portion of each bearing cap section to securely connect all the bearing cap sections with each other. Additionally, first and second side wall sections are respectively connected to the opposite side portions of each bearing cap section to securely connect all the bearing cap sections with each other. Therefore, the bearing beam structure is greatly improved in torsional and flexural strength. This improves the rigidity of the entire cylinder block and suppresses deformation of a cylinder block skirt section, thereby effectively reducing noise emission from the engine.

BRIEF DESCRIPTION OF THE DRAWINGS

The features and advantages of the bearing beam structure according to the present invention will be better appreciated from the following description taken in conjunction with the accompanying drawings in which the same reference numerals designate the corresponding parts and elements, in which.

DETAILED DESCRIPTION OF THE INVENTION

Figure 1:
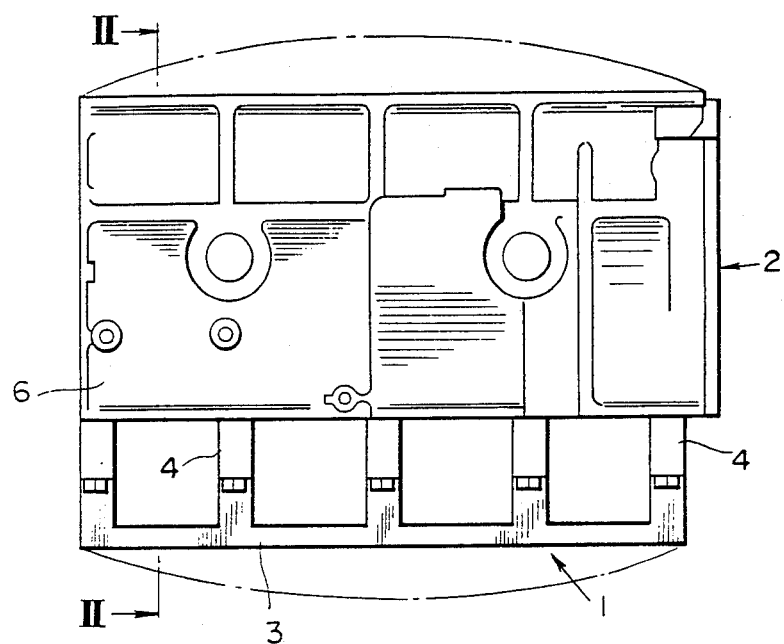
FIG. 1 is a front elevation of a cylinder block equipped with a conventional bearing beam structure.
Figure 2:
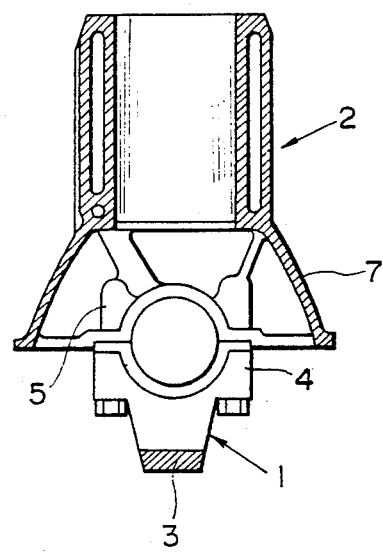
FIG. 2 is a vertical sectional view taken in the direction of the arrows substantially along the line II—II of FIG. 1.
Figure 3:
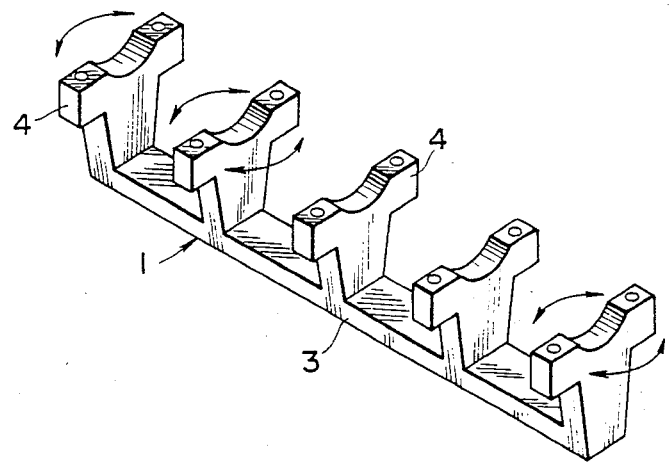
FIG. 3 is a perspective view of the conventional bearing beam structure of FIG. 1.

Referring to FIGS. 1 to 3, a conventional bearing beam structure of an automotive internal combustion engine will be described along with its major shortcomings. The bearing beam structure 1 is securely installed on the bottom part of a cylinder block 2 of the engine and includes a beam section 3 which integrally connects a plurality of bearing cap sections 4 with each other in the fore and aft direction of the engine, thus forming a bearing beam structure of the one-piece type. The bearing cap sections 4 are respectively secured to the bearing sections 5 of the cylinder block 2, so that a crankshaft (not shown) is rotatably supported by the cylinder block bearing sections and the bearing beam structure bearing cap sections.

With such a bearing beam structure, the bearing cap sections are prevented from moving by virtue of the beam section 3 and therefore each bearing cap section 4 is suppressed in its coming down vibration (vibration in fore and aft direction). Additionally, the rigidity of the cylinder block 2 is improved against flexure indicated in phantom in FIG. 1, thus suppressing the vibration of the skirt section 6 of the cylinder block 2. This reduces noise emission from the cylinder block skirt section 6.

However, the above-mentioned bearing beam structure 1 has encountered the following shortcomings: The bearing beam structure 1 is not effective for suppressing torsional deformation of the cylinder block 2 around the axis of the crankshaft since the bearing cap sections 4 are connected only at their bottom end portion with each other. Besides, the bearing beam structure 1 is not so effective for suppressing flexure applied to each bearing cap section around the axis of each cylinder bore as indicated by arrows in FIG. 3. Thus, the cylinder block 2 and the bearing beam structure 1 emit vibration noise due to such deformations, not giving a sufficient engine noise reduction.

Figure 4:
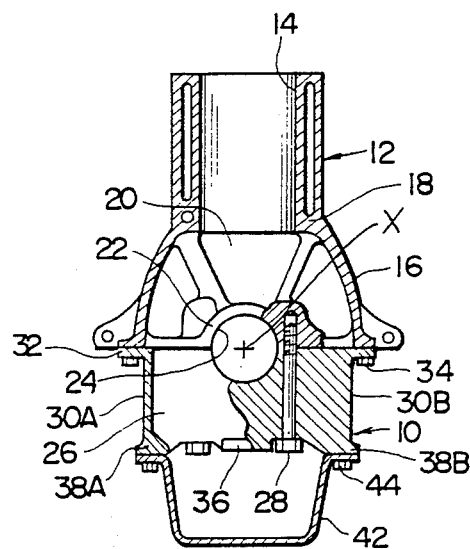
FIG. 4 is a vertical sectional view of a cylinder block equipped with a preferred embodiment of a bearing beam structure in accordance with the present invention.
Figure 5A:
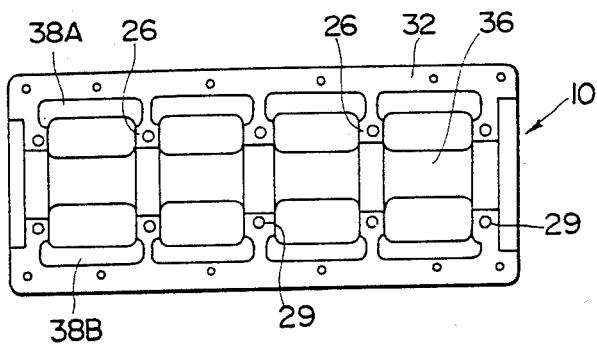
FIGS. 5A to 5E are plan view, front elevation, bottom view, side view, and sectional view, respectively, of the bearing beam structure of FIG. 4.
Figure 5D:
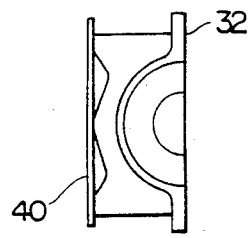
Figure 5B:
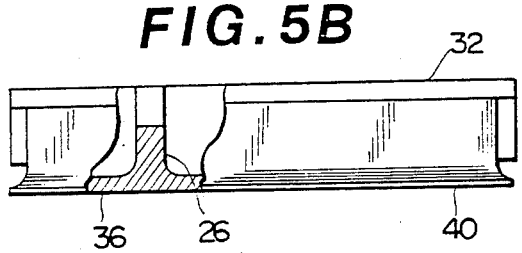
Figure 5E:
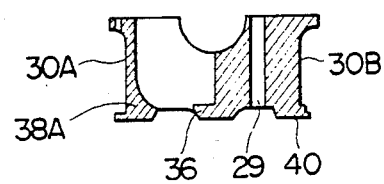
Figure 5C:
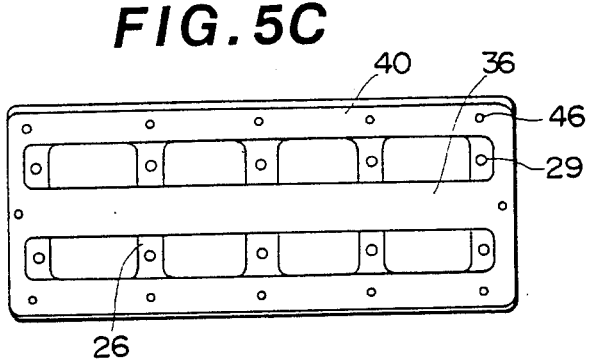
Figure 6A:
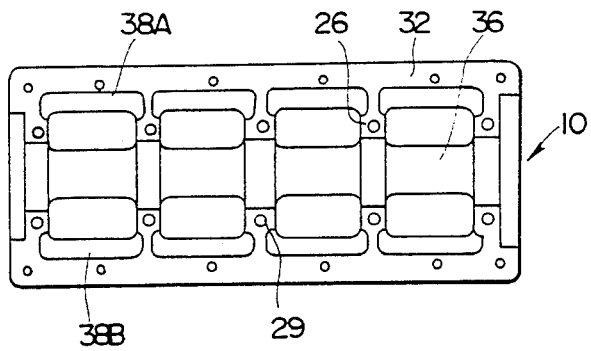
FIGS. 6A to 6E are similar to FIGS. 5A to 5E, respectively, but showing another embodiment of the bearing beam structure in accordance with the present invention.
Figure 6D:
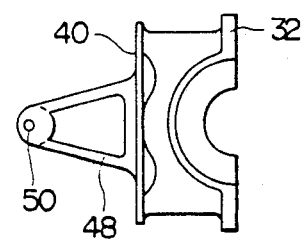
Figure 6B:
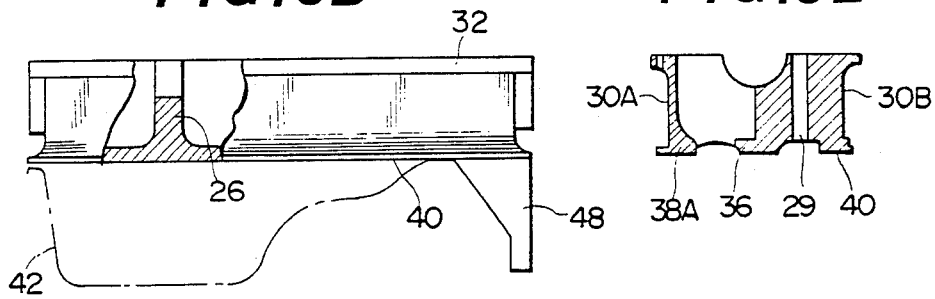
Figure 6E:
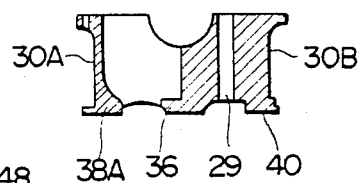
Figure 6C:
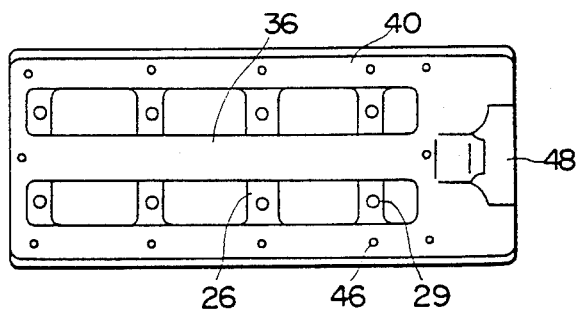

In view of the above description of the conventional bearing beam structure, reference is now made to FIGS. 4 to 5E, wherein a preferred embodiment of a bearing beam structure 10 of the present invention is shown in combination with a cylinder block 12 of an automotive internal combustion engine. The cylinder block 12 is formed with a plurality of cylinder barrels 14 each of which defines therein a cylinder bore (no numeral). The cylinder block includes a skirt section 16 which bulges outwardly and extends downwardly to define an upper part of a crankcase (no numeral). The skirt section 16 is integrally connected through a lower block deck 18 with the cylinder barrels 14. A plurality of main bearing bulkheads 20 are aligned parallel with each other and located inside the skirt section 16. Each bearing bulkhead 20 is located below and connected to a portion between the adjacent two cylinder barrels 14. The bearing bulkhead 20 is integrally connected at its top part with the lower block deck 18 and at its sides with the inner wall of the skirt section 16. Each bearing bulkhead 20 is provided at its bottom central portion with a bearing section 22 defining the top of a bore 24 in which the journal of a crankshaft (only its axis X is shown) is rotatably disposed.

The bearing beam structure 10 is securely connected to the bottom part of the cylinder block 12 and includes a plurality of main bearing cap sections 26. Each bearing cap section 26 defines the bottom of the bore 24 and is secured onto a bearing bulkhead 20 by means of cap bolts 28 so as to associate with the bearing section 22 of the bearing bulkhead 20, thereby rotatably supporting the journal of the crankshaft in the bore 24. The cap bolts 28 respectively pass through bolt holes 29 of the bearing cap sections 26. In this case, the bearing cap section 28 is generally in the shape of a rectangle, as viewed in the direction of the crankshaft axis X, whose top part has a width generally corresponding to that of the widened bottom part of the skirt section 16.

All the bearing cap sections 26 are integrally connected with each other by two side wall sections 30A, 30B which are generally vertical and form opposite side walls of the bearing beam structure 10. The two side wall sections 30A, 30B extend parallel along the crankshaft axis X and are located at or formed respectively along the opposite side portions of each bearing cap section 26. The two side wall sections 30A, 30B are symmetrical with each other with respect to a vertical plane (not shown) containing the crankshaft axis X. These side wall sections 30A, 30B are formed respectively with flanges 32 which are secured to the bottom end portion of the cylinder block skirt section 16 by means of bolts 34, thus forming part of a crankcase.

Furthermore, all the bearing cap sections 26 are integrally connected with each other by an elongate central beam section 36 and side beam sections 38A, 38B, all the beam sections extending parallel along the crankshaft axis X. The central beam section 36 is located at or formed along the center of the bottom portion of each bearing cap section 26, while the side beam sections 38A, 38B are respectively located at or formed along the opposite sides of the bottom portion of each bearing cap section 26. These side beam sections 38A, 38B are respectively integral with the side wall sections 30A, 30B at the bottom thereof. The bottom surface of bearing beam structure 10 is formed with flanges 40 to which an oil pan 42 is installed by means of bolts 44 threaded into bolt holes 46 of the flange 40. In this instance, the flanges 40 are integral respectively with the side beam sections 38A, 38B. The bearing beam structure 10 of this embodiment is produced by being integrally cast using a light alloy, such as an aluminum alloy, so that the bearing beam structure is of the one-piece type.

With the thus arranged bearing beam structure 10, the coming down vibration of each bearing cap section is of course suppressed in the fore and aft direction. Additionally, each bearing cap section 26 is greatly improved in strength against bending force applied around the axis of each cylinder bore, thereby effectively suppressing torsional and flexural vibrations of each bearing section 22. As a result, noise emission from the cylinder block skirt section 16 is reduced. Furthermore, the entire cylinder block 12 is improved in strength against torsion around the crankshaft axis X, and the cylinder block skirt section 16 is prevented from opening and closing movement or deformation. The combined effect of these effectively suppresses noise generation and emission from the engine. Moreover, as a result of the fact that the bearing beam structure 10 forms part of the crankcase, the oil pan 42 may be smaller in size, thereby noticeably reducing noise generation in the oil pan 42.

FIGS. 6A to 6E illustrate another embodiment of the bearing beam structure according to the present invention, in which the bearing beam structure 10 is formed at its rear end with a support arm section 48 which is to be connected to a transmission housing at the peripheral portion of the open end section, though not shown. The support arm section 48 is smoothly integral with the beam sections 36, 38A, 38B and the side wall sections 30A, 30B, and is formed at its tip with a through-hole 50 for a bolt (not shown) by which the support arm section 48 is bolted to the transmission housing.

With this embodiment, the connection-rigidity between the cylinder block 12 and the transmission is improved thereby reducing low frequency noise generated within a vehicle passenger compartment which noise is due to lack of connection-rigidity. Additionally, opening and closing movement vibration of the open end section of the transmission housing is also suppressed, thus preventing noise generation from the transmission housing.

As will be appreciated from the above, the bearing beam structure according to the present invention effectively suppresses torsional vibration etc. of each bearing cap section, and greatly improves the rigidity of the entire cylinder block, thus achieving greater noise reduction as compared with a conventional bearing beam structure.

What is claimed is:

1. A bearing beam structure of an internal combustion engine having a cylinder block formed with a plurality of bearing sections, said bearing beam structure comprising:
   a plurality of main bearing cap sections each of which associates with a cylinder block bearing section to rotatably support a journal of a crankshaft;
   a central beam section integrally directly connected with a central part of a lower end portion of each bearing cap section to securely connect said bearing cap sections with each other;
   first and second side beam sections integrally directly connected respectively to opposite end parts of the lower end portion of each bearing cap section to securely connect said bearing cap sections with each other; and
   first and second side wall sections respectively integrally connected with opposite side portions of each bearing cap section to securely connect said bearing cap sections with each other.

2. A bearing beam structure as claimed in claim 1, wherein said first and second integral side wall sections extend along an axis of said crankshaft, said side wall sections being generally parallel with a vertical plane containing an axis of said crankshaft.

3. A bearing beam structure as claimed in claim 1, wherein each bearing cap section is generally rectangular as viewed from a direction of an axis of said crankshaft, in which said first and second side beam sections are located respectively at opposite lower corners of said bearing cap section.

4. A bearing beam structure as claimed in claim 1, further comprising flanges formd at a bottom section of said bearing beam structure, said flanges being integral with said first and second side beam sections and securely connected to an oil pan.

5. A bearing beam structure as claimed in claim 1, further comprising a support arm section integrally formed at an end part of said bearing beam structure and connected to a housing of a transmission, said support arm section being integral with said beam sections and said first and side wall sections.

6. A bearing beam structure as claimed in claim 1, wherein said entire bearing beam structure is a one-piece integral unit.

7. A bearing beam structure as claimed in claim 1, wherein said first and second wall sections form outer walls of a crankcase of said engine.

* * * * *